United States Patent [19]
Duva

[11] Patent Number: 5,771,847
[45] Date of Patent: Jun. 30, 1998

[54] FUEL OXIDIZER EMULSION INJECTION SYSTEM

[75] Inventor: Anthony W. Duva, Middletown, R.I.

[73] Assignee: The United States of America as represented by the Secretary of the Navy, Washington, D.C.

[21] Appl. No.: 684,837

[22] Filed: Jun. 24, 1996

[51] Int. Cl.$^6$ .............................. F02D 41/14; F02B 45/00; F02B 47/02
[52] U.S. Cl. .......................... 123/1 A; 123/25 E; 123/672; 123/676
[58] Field of Search ................................... 123/1 A, 25 R, 123/25 E, 676, 672, 304

[56] References Cited

U.S. PATENT DOCUMENTS

| 4,091,769 | 5/1978 | Baldwin | 123/1 A |
| 4,327,688 | 5/1982 | Lowther | 123/435 |

Primary Examiner—Tony M. Argenbright
Attorney, Agent, or Firm—Michael J. McGowan; Robert W. Gauthier; Prithvi C. Lall

[57] ABSTRACT

A system for improving efficiency and reducing harmful emissions in an internal combustion engine and for allowing the engine to run in oxygen poor and oxygen depleted environments. An oxidant, such as hydrogen peroxide, is emulsified with engine fuel. The emulsion is injected into the combustion chamber of the engine. A controller senses the temperature and oxygen level in the exhaust stream of the engine as well as the oxygen level in the ambient fluid. The controller operates a valve to vary the amount of oxidant added to the fuel as well as controlling the amount of ambient air introduced into the chamber and the injection of the fuel oxidant emulsion into the chamber. The controller parameters are set to maintain maximum efficiency and minimum emissions. The oxidant in the emulsion provides for near stoichiometric combustion to reduce combustion products and reduce the engine's air requirements. The reduced air requirements allow for operation of the engine in oxygen poor environments and is oxygen depleted environments, such as operation at high altitudes or operation underwater. Water is added to the emulsion oxidant to cool the stoichiometric combustion temperature to prevent excessive engine wear and to further block the formation of oxides of nitrogen.

12 Claims, 2 Drawing Sheets

FUEL OXIDIZER EMULSION INJECTION SYSTEM

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATION

This patent application is co-pending with related patent application Ser. No. 08/684,835 filed Jun. 24, 1996 and entitled Exhaust Control Through a Hydrogen Peroxide Fuel Augmentation System, by the same inventor as this application.

BACKGROUND OF THE INVENTION

1. ) Field of the Invention

The present invention relates to internal combustion engine systems and more particularly to a system for reducing the exhaust emissions of an internal combustion engine and for allowing operation of an internal combustion engine in an oxygen poor environment. The system utilizes a mixture of oxidant and water which is emulsified with the fuel. The emulsion is injected into the piston chamber of the engine. The oxidant provides for near stoichiometric combustion to reduce combustion products and reduce the engine's air requirements. The water serves to cool the stoichiometric combustion temperature to prevent excessive engine wear and to block the formation of oxides of nitrogen.

2. ) Description of the Prior Art

It is known to utilize fossil fuel distillates, such as diesel fuel or gasoline, or organic fuels, such as alcohol, for combustion in internal combustion engines. Typically, a piston or rotary engine operates on a two or four cycle process to compress air and inject fuel or a fuel/air mixture to initiate combustion in a cylinder or chamber for the purpose of releasing the thermal potential energy of the mixture to form a high pressure, high temperature working fluid. In a piston engine, the thermal energy is transferred to axial motion of the piston which in turn rotates the main engine shaft to generate mechanical work. In a rotary engine, the thermal energy is transferred directly to the output shaft through rotation of the rotor. For clarity, the remainder of the description will focus on piston engines. However, it is to be understood that the discussion applies to any power system in which thermal energy is converted to mechanical energy.

The typical two or four cycle process uses available air as a means to deliver the oxygenated working fluid necessary to burn with the fossil or organic fuels. During the induction phase of a diesel cycle, the piston displacement in a cylinder causes air to be drawn into the cylinder. The air intake valve or port is then closed as the piston begins traveling to the minimum volume position of the cycle. As the air in the cylinder is compressed, temperature and pressure of the air increase. Just prior to reaching the minimum volume, maximum temperature and pressure position, fuel is injected into the cylinder or pre-combustion chamber. The fuel ignites in the presence of the high temperature, high pressure air in a fuel rich central zone and oxygen rich perimeter. In an internal spark ignition engine, fuel is mixed with the air prior to compression. When compressed, the fuel/air mixture is ignited with an electrical stimulus from a spark plug. The combustion process initiates from a point adjacent the spark and propagates outward to consume the majority of the fuel/air mixture. In both engine types, the combustion process is not steady and can be quenched by relatively cold engine components.

These prior art engines generate several combustion products, such as unburned hydrocarbons (HC), carbon monoxide (CO) and oxides of nitrogen (NOx), which present environmental hazards. Numerous studies, e.g., Jiang, Q., Ottikkutti, P., VanGerpen, J., VanMeter, D.,: "The Effect of Alcohol Fumigation on Diesel Flame Temperature and Emissions," Society of Automotive Engineers Transactions Volume 99, Section 3, 1990 paper number 900386, have shown a direct correlation of NOx formation to combustion temperature. However, lowering the combustion temperature also results in incomplete combustion with a corresponding increase in HC and CO emissions. Also, these engines are dependent on receiving adequate oxygen for combustion from the ambient air, making them unsuitable for operation in oxygen poor environments, such as in ultra high altitude environments or in underwater environments. To provide the necessary oxygen to systems operating in these environments, extraordinary measures must be taken, such as carrying liquid oxygen or providing multiple stages of turbo charging. The resulting systems are heavy, inefficient and quite large in size. Further, controllers within these engines attempt to improve efficiency and reduce emissions by controlling the flow of ambient air into the engine and thus the fuel/air mixture being combusted in the cylinder compartment. Such control systems do provide improved efficiency and reduced emissions, but may not result in the most efficient combustion or lowest emissions. The oxygen content of the ambient air may vary significantly such that it may be impossible for the controller to provide adequate oxygen, regardless of air flow. In the case of underwater operation, no air is available to provide the necessary oxygen.

SUMMARY OF THE INVENTION

Accordingly, it is a general purpose and object of the present invention to provide a system for an internal combustion engine to control and reduce environmentally hazardous exhaust emissions such as hydrocarbons, carbon monoxide and oxides of nitrogen.

It is a further object that the system provide a means for operating internal combustion engines in standard, low and oxygen depleted environments.

These objects are accomplished with the present invention by providing an injection system for an internal combustion engine which utilizes an oxidant and water mixture emulsified within the fuel. The emulsion is injected into the piston chamber in a manner similar to current fuel injection methods. The emulsion serves to lower the combustion temperature which in turn lowers the formation of oxides of nitrogen. The oxidant within the fuel provides sufficient oxygen for complete combustion of the fuel which reduces environmentally harmful combustion products such as unburned hydrocarbons and carbon monoxide. Complete combustion may lead to excessive engine temperatures and wear. The water added to the oxidant quenches the stoichiometric combustion temperature, preventing excessive engine wear and also contributing to the reduction of oxides of nitrogen. The oxidant further provides the necessary oxygen for combustion and reduces the need to obtain oxygen from the ambient air, thus allowing operation of the engine in oxygen poor environments.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
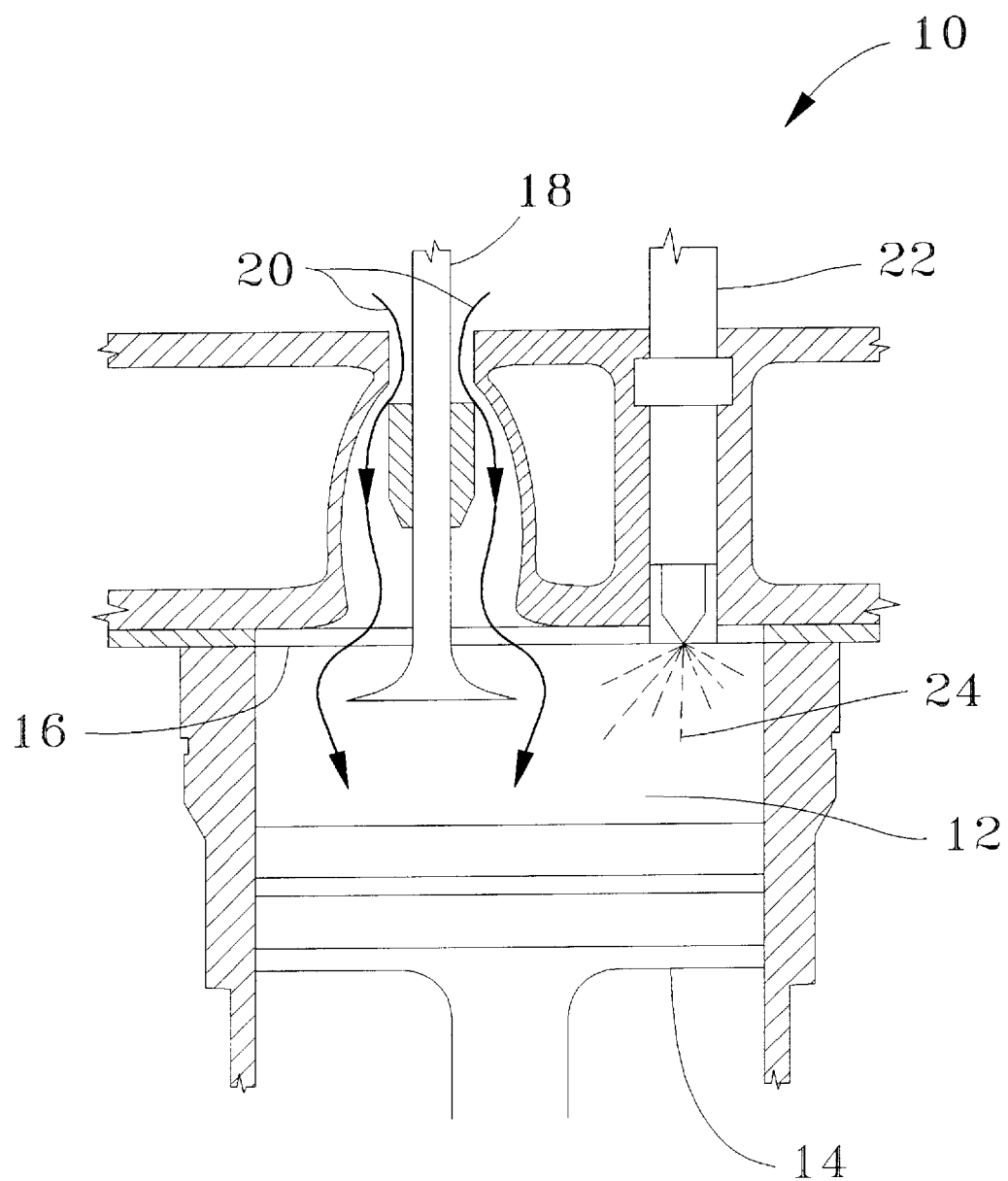
FIG. 1 shows a cross sectional view of an engine with the emulsion injection system of the present invention.

Referring now to FIG. 1, there is shown a cross sectional view of an engine 10 taken through piston chamber 12 of engine 10. As piston 14 moves away from top surface 16 of chamber 12, air intake valve 18 opens to allow air into piston chamber 12, as shown by arrows 20. As piston 14 moves back toward surface 16, valve 18 closes stopping the flow of air. Just prior to maximum compression, injector 22 injects fuel oxidant emulsion, indicated by lines 24, into chamber 12. The fuel oxidant emulsion ignites in the presence of the high temperature, high pressure air. The ignition forces piston 14 away from surface 16, and this power stroke movement is converted to useful work. In a typical four stroke engine, piston 14 again moves towards surface 16 and expels combustion gases through an exhaust port (not shown in FIG. 1). The four stroke cycle of air intake, compression, power stroke and exhaust begins again.

Figure 2:
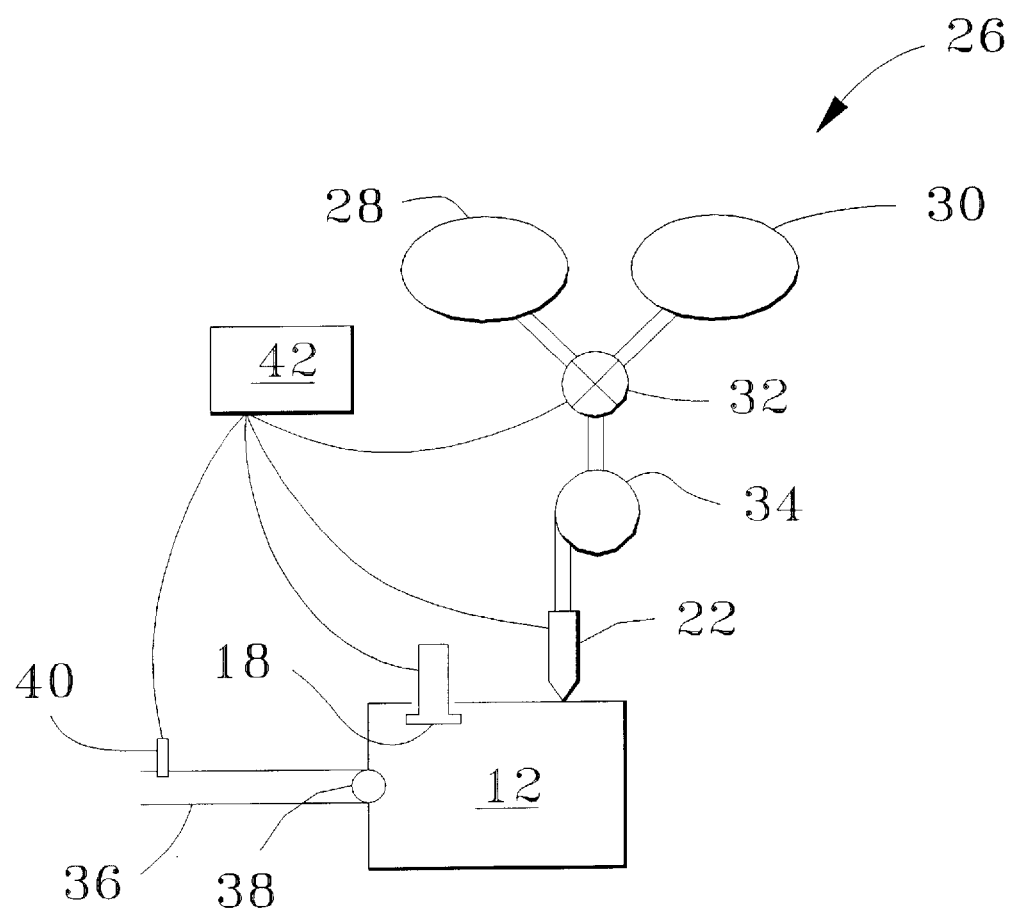
FIG. 2 shows a schematic representation of the injection system of the present invention.

Referring now additionally to FIG. 2, there is shown a schematic representation of a fuel oxidizer emulsion system 26 for use on engine 10. Standard fossil or organic fuel is stored in fuel tank 28 and an oxidant is stored in oxidant tank 30. The oxidant used may be hydrogen peroxide, hydroxyl ammonium nitrate, or any such liquid oxidant whose chemical decomposition readily liberates free oxygen upon heating or increased pressure. Tanks 28 and 30 are connected to mixing control valve 32 where the fuel and oxidant fed to and combined in fuel pump 34 to form emulsion 24. Emulsion 24 is fed through injector 22 into piston chamber 12. Exhaust outlet 36 is connected to chamber 12 via exhaust port 38. Sensor 40 in exhaust outlet 36 provides temperature and oxygen level readings to controller 42 which operates mixing control valve 32 to control the amount of oxidant used to form emulsion 24 entering chamber 12. Sensor 40 monitors the temperature and oxygen level of the combustion byproducts and may also monitor ambient air oxygen levels. Depending on the internal parameters chosen, controller 42 may also vary the amount of ambient air introduced into chamber 12 by controlling air intake valve 18 opening and may also control the flow of fuel oxidant emulsion 24 through injector 22. In oxygen poor environments, such as high altitude operation, controller 42 may allow additional oxidant to enter through control valve 32 to satisfy oxygen requirements for combustion, or the air to fuel ratio may be increased by controller 42 allowing additional ambient air through intake valve 18, or a combination of both additional oxidant and air may be required depending on the parameters set and the readings obtained from sensor 40. In oxygen depleted environments, such as underwater, air intake valve 18 would remain closed and the total oxygen requirements would be provided by the fuel oxidant emulsion.

The fuel oxidant emulsion injection system of the present invention has many advantages over the prior art. Controller 42 acts in a manner similar to fuel/air mixture controllers in existing engine systems. However, more precise control of the oxygen level can be obtained by having the controller govern the amount of oxidant combining with the fuel since, unlike ambient air, the fuel oxidant emulsion is a determinable oxygen source. The greater control afforded by the use of the present system provides for more efficient combustion and reduced emissions. Further, depending on the emulsion used, the engine is provided with an essentially unlimited source of oxygen allowing operation in oxygen poor and oxygen depleted environments.

What has thus been described is a system for injecting a fuel oxidant emulsion into the combustion chamber of an internal combustion engine to improve efficiency and reduce harmful emissions. The emulsion also provides the necessary oxygen to run the engine in oxygen poor or oxygen depleted environments, such as high altitude operation or underwater operation. The system has a fuel tank and an oxidant tank. A controlled amount of oxidant is added to the fuel by a mixing valve just prior to the fuel pump. The fuel and oxidant mix or emulsion are pumped to the combustion chamber of the engine. The flow of emulsion into the chamber is governed by an injector and the air intake into the chamber is governed by an air intake valve. A controller governs the fuel/oxidant mixing valve, the injector and the air intake into the chamber. The controller senses the temperature and level of oxygen in the engine exhaust as well as the ambient fluid oxygen level and controls the air intake flow, the fuel/oxidant mixture and the emulsion flow to maintain maximum efficiency and minimum emissions in accordance with predetermined parameter settings.

Obviously many modifications and variations of the present invention may become apparent in light of the above teachings. For example, the system can be used on any type of engine burning fossil or organic fuels. Also, the oxidant can be any one of a number of substances which provide free oxygen for combustion, such as hydrogen peroxide or hydroxyl ammonium nitrate.

In light of the above, it is therefore understood that within the scope of the appended claims, the invention may be practiced otherwise than as specifically described.

what is claimed is:

1. A system for reducing exhaust emissions in an engine combusting at least one of a fossil fuel and an organic fuel, the system comprising:

a first tank for storage of said at least one fuel;

an oxidant;

a second tank for storage of said oxidant;

a mixing valve combining the at least one fuel from the first tank and the oxidant from the second tank, said oxidant being emulsified in said at least one fuel to form a fuel oxidant emulsion; and an injector for introducing the emulsion into a combustion chamber of said engine, the emulsion flowing through the injector into the chamber, the emulsion being ignited in the combustion chamber to provide a work output, the oxidant resulting in a more complete combustion when compared to combustion of the at least one fuel without the emulsified oxidant of said emulsion, the more complete combustion resulting in a lowering of emissions of unburned hydrocarbon and lower emissions of carbon monoxide.

2. The system of claim 1 further comprising a controller governing the operation of the injector, the controller operating to maintain emulsion flow through the injector at a level consistent with maximum combustion efficiency.

3. The system of claim 2 further comprising an air intake valve for introducing a flow of air into the chamber, the controller governing the operation of the air intake valve to maintain air flow into the chamber at a level consistent with maximum combustion efficiency.

4. The system of claim 3 further comprising a sensor connected to the controller, the sensor providing input data to the controller on engine operating parameters.

5. The system of claim 4 wherein the engine operating parameters further comprise:

a temperature of an exhaust stream of the engine; and an oxygen level of said exhaust stream.

6. The system of claim 1 wherein said oxidant is selected from a group consisting of liquids which liberate free oxygen during chemical decomposition resulting from at least one of a process of heating and a process of increasing pressure.

7. The system of claim 1 wherein said oxidant is selected from a group consisting of hydrogen peroxide and hydroxyl ammonium nitrate.

8. The system of claim 7 wherein water is added to the oxidant, the water serving to lower a combustion temperature to prevent excessive wear of the engine, the lower combustion temperature reducing emissions of oxides of nitrogen.

9. The system of claim 1 further comprising a controller governing the operation of the mixing valve, the controller operating to maintain a ratio of oxidant to fuel in the emulsion at a level consistent with maximum combustion efficiency.

10. The system of claim 3 further comprising a mixing valve combining the fuel and the oxidant for forming said emulsion, the controller governing the operation of the mixing valve to maintain the ratio of oxidant to fuel in the emulsion at a level consistent with maximum combustion efficiency.

11. A method for reducing emissions from an engine combusting at least one of a fossil fuel and an organic fuel, the method comprising the steps of:

storing the at least one fuel in a first tank;

storing an oxidant in a second tank;

introducing the at least one fuel from the first tank into a mixing valve and introducing the oxidant from the second tank into the mixing valve;

emulsifying the oxidant with the at least one fuel in the mixing valve to produce a fuel oxidant emulsion;

injecting the fuel oxidant emulsion into a combustion chamber of the engine; and combusting the fuel oxidant emulsion to produce a more complete combustion when compared to combustion of the at least one fuel without the emulsified oxidant, the more complete combustion resulting in a lowering of emissions of unburned hydrocarbon and lower emissions of carbon monoxide.

12. The method of claim 11 further comprising the step of controlling the amount of fuel oxidant emulsion being combusted in the engine at a level consistent with maximum combustion efficiency.

* * * * *